United States Patent
Ben-Eli et al.

(10) Patent No.: US 8,290,077 B1
(45) Date of Patent: Oct. 16, 2012

(54) COMMUNICATION WITH MULTIPLE USERS OVER A SINGLE TIME SLOT USING HIGH-ORDER MODULATION

(75) Inventors: David Ben-Eli, Modiin (IL); Tomer Goshen, Kfav-Saba (IL); Yona Perets, Ra'anana (IL); Paul S. Spencer, Modiin (IL); Amir Winstok, Tel Aviv (IL)

(73) Assignee: Marvell International Ltd., Hamilton (BM)

( * ) Notice: Subject to any disclaimer, the term of this patent is extended or adjusted under 35 U.S.C. 154(b) by 778 days.

(21) Appl. No.: 12/367,630

(22) Filed: Feb. 9, 2009

Related U.S. Application Data (60) Provisional application No. 61/113,416, filed on Nov. 11, 2008, provisional application No. 61/091,901, filed on Aug. 26, 2008, provisional application No. 61/090,338, filed on Aug. 20, 2008, provisional application No. 61/048,437, filed on Apr. 28, 2008, provisional application No. 61/035,349, filed on Mar. 10, 2008, provisional application No. 61/029,708, filed on Feb. 19, 2008, provisional application No. 61/027,978, filed on Feb. 12, 2008.

(51) Int. Cl.
 *H04L 5/12* (2006.01)
(52) U.S. Cl. .................. 375/261; 370/335
(58) Field of Classification Search ............ 370/328, 370/335, 342; 375/261, 264
 See application file for complete search history.

(56) References Cited

U.S. PATENT DOCUMENTS

| | | | | |
|---|---|---|---|---|
| 7,230,994 | B2 * | 6/2007 | Noda ........................ | 375/286 |
| 2004/0082333 | A1 * | 4/2004 | Ito et al. ...................... | 455/450 |
| 2006/0072514 | A1 * | 4/2006 | Kent et al. ................... | 370/335 |
| 2007/0286124 | A1 | 12/2007 | Grant et al. | |
| 2008/0112477 | A1 | 5/2008 | Choi et al. | |
| 2008/0168332 | A1 | 7/2008 | Palanki et al. | |
| 2008/0311920 | A1 * | 12/2008 | Xu et al. ..................... | 455/450 |
| 2010/0081445 | A1 | 4/2010 | Aghili et al. | |
| 2010/0165894 | A1 | 7/2010 | Furuskar et al. | |
| 2010/0203854 | A1 | 8/2010 | Yu et al. | |
| 2010/0203897 | A1 | 8/2010 | Jamadagni et al. | |
| 2010/0322092 | A1 | 12/2010 | Yu | |
| 2011/0143766 | A1 | 6/2011 | Sun et al. | |

OTHER PUBLICATIONS

"Higher Uplink Performance for GERAN Evolution (HUGE)", 3GPP TSG GERAN # 30, Lisbon, Portugal, Jun. 26-30, 2006.
Ericsson, "Assessment of Hot Performance Based on EGPRS Performance in Live Networks", 3GPP TSG GERAN # 32, Sophia Antipolis, France, Nov. 13-17, 2006.
"New Wid on Reduced Symbol Duration, Higher Order Modulation and Turbo Coding (Red Hot) for Downlink", 3GPP, TSG GERAN # 32, Sophia Antipolis, France, Nov. 13-17, 2006.
Qualcomm Europe, "Speech Capacity Enhancements Using DARP", 3GPP TSG-GERAN # 36, Vancouver, Canada, Nov. 12-16, 2007.
Nokia Siemens Networks, Nokia Corporation, "Voice Capacity Evolution With Orthogonal Sub Channels", 3GPP TSG GERAN # 36, Vancouver, Canada, Nov. 12-16, 2007.
"Multi-User Reusing-One-Slot (MUROS)", 3GPP TSG GERAN # 36, Vancouver, Canada, Nov. 12-16, 2007.

(Continued)

*Primary Examiner* — Leon-Viet Nguyen (57) ABSTRACT

A method for communication includes defining a signal constellation including multiple constellation points in a signal space, such that each constellation point corresponds to a signal representing a respective combination of values of at least three bits, wherein three or more subsets of the bits in each of the constellation points are respectively allocated to three or more data streams. A sequence of signals is received, each signal selected from the signal constellation. The received sequence of the signals is demodulated, and one of the three or more data streams is reconstructed based on the demodulated signals.

13 Claims, 3 Drawing Sheets

OTHER PUBLICATIONS

Telefon AB LM Ericsson, "Adaptive Symbol Constellation for MUROS (Downlink)", 3GPP TSG GERAN # 37, Seoul, South Korea, Feb. 18-22, 2008.

Telefon AB LM Ericsson, "Frequency Hopping Schemes for MUROS", 3GPP TSG GERAN # 38, Malaga, Spain, May 12-16, 2008.

Research in Motion Ltd, "On Training Sequences for MUROS", 3GPP TSG GERAN # 39, Florence, Italy, Aug. 25-29, 2008.

Marvell, "Higher Order Modulations for MUROS—Concept Description", 3GPP GERAN Teleconference # 1 on MUROS, Mar. 11, 2008.

3rd Generation Partnership Project; Technical Specification Group GSM/EDGE Radio Access Network; Radio Transmission and Reception (Release 7), 3GPP TS 45.005 V7.15.0 (Aug. 2008), Sophia Antipolis, France.

3GPP; Technical Specification Group GSM/EDGE Radio Access Network: Multiplexing and multiple access on the radio path (Release 7); 3GPP TS 45.002 V7.7.0; May 2008; 3GPP Organizational Partners; Valbonne, France.

Samsung; Soft-Pairing—Supporting Intra cell-Inter channel measurements for initial pairing in MUROS/VAMOS; 3GPP TSG GERAN WG1#42—Agenda item 7.1.5.10; May 2009; Shenzhen, China.

"3rd Generation Partnership Project; Technical Specification Group GERAN; Circuit Switched Voice Capacity Evolution for GSM/EDGE Radio Access Network (GERAN) (Release 8)," 3GPP TR 45.914 V8.1.0 Technical Report, 3GPP, Valbonne France, pp. 1-254 (2009).

U.S. Appl. No. 12/858,446 Official Action dated Aug. 23, 2012.

* cited by examiner

COMMUNICATION WITH MULTIPLE USERS OVER A SINGLE TIME SLOT USING HIGH-ORDER MODULATION

CROSS-REFERENCE TO RELATED APPLICATIONS

This application claims the benefit of U.S. Provisional Patent Application 61/027,978, filed Feb. 12, 2008, U.S. Provisional Patent Application 61/029,708, filed Feb. 19, 2008, U.S. Provisional Patent Application 61/035,349, filed Mar. 10, 2008, U.S. Provisional Patent Application 61/048,437, filed Apr. 28, 2008, U.S. Provisional Patent Application 61/090,338, filed Aug. 20, 2008, U.S. Provisional Patent Application 61/091,901, filed Aug. 28, 2008, and U.S. Provisional Patent Application 61/113,416, filed Nov. 11, 2008, whose disclosures are incorporated herein by reference.

FIELD OF THE INVENTION

The present invention relates generally to communication systems, and particularly to methods and systems for transmitting signals using high-order modulation.

BACKGROUND OF THE INVENTION

In some communication networks, signals are transmitted simultaneously to multiple users over the same radio resource. For example, some proposed Global System for Mobile communications (GSM) EDGE Radio Access Network (GERAN) configurations support a feature that is referred to as Multi-User Reusing-One-Slot (MUROS). MUROS defines a scheme in which two users are multiplexed in the same time slot. MUROS is described, for example, in "Multi-User Reusing-One-Slot (MUROS)," document GP-072033 of the Third Generation Partnership Project (3GPP) GERAN Technical Specification Group (TSG) #36, Vancouver, Canada, Nov. 12-16, 2007, which is incorporated herein by reference.

Example methods for performing such multiplexing are proposed in "Voice Capacity Evolution with Orthogonal Sub Channels," Document GP-071792 of 3GPP GERAN TSG #36, Vancouver, Canada, Nov. 12-16, 2007, and in "Speech Capacity Enhancements using DARP," Document GP-071738 of 3GPP GERAN TSG #36, Vancouver, Canada, Nov. 12-16, 2007, which are incorporated herein by reference.

Some GERAN networks use high-order modulation schemes. Such techniques are addressed, for example, in "Reduced Symbol Duration, Higher Order Modulation and Turbo Coding (RED HOT) for Downlink," Document GP-062488 of 3GPP GERAN TSG #32, Sophia Antipolis, France, Nov. 13-17, 2006, and in "Higher Uplink Performance for GERAN Evolution (HUGE)," Document GP-061478 of 3GPP GERAN TSG #30, Lisbon, Portugal, Jun. 26-30, 2006, which are incorporated herein by reference.

SUMMARY OF THE INVENTION

An embodiment of the present invention provides a method for communication. A signal constellation including multiple constellation points is defined in a signal space, such that each constellation point corresponds to a signal representing a respective combination of values of two or more bits. First and second subsets of the bits in each of the constellation points, which have different, respective first and second demodulation performance levels, are respectively allocated to modulation of first and second data. A sequence of signals, each selected from the signal constellation, is received. The received sequence of the signals is demodulated, and the first data is reconstructed based on the demodulated signals.

There is additionally provided, in accordance with an embodiment of the present invention, a method for communication. A signal constellation including multiple constellation points is defined in a signal space, such that each constellation point corresponds to a signal representing a respective combination of values of two or more bits. An allocation of first and second subsets of the bits in each of the constellation points is defined for data transmission to respective first and second communication terminals, such that the first and second subsets have different, respective first and second demodulation performance levels. Respective first and second data destined to the first and second communication terminals is modulated by selecting a sequence of signals from the constellation in accordance with the allocation. The sequence of the modulated signals is transmitted to the first and second communication terminals.

There is also provided, in accordance with an embodiment of the present invention, a method for communication. The method includes defining a signal constellation including multiple constellation points in a signal space, such that each constellation point corresponds to a signal representing a respective combination of values of at least three bits. Three or more subsets of the bits in each of the constellation points are respectively allocated to three or more data streams. A sequence of signals is received, each signal selected from the signal constellation. The received sequence of the signals is demodulated, and one of the three or more data streams is reconstructed based on the demodulated signals.

There is further provided, in accordance with an embodiment of the present invention, a method for communication. The method includes defining a signal constellation including multiple constellation points in a signal space, such that each constellation point corresponds to a signal representing a respective combination of values of at least three bits. An allocation of three or more subsets of the bits in each of the constellation points is defined for data transmission respectively to three or more communication terminals. Three or more data streams destined respectively to the three or more communication terminals are modulated by selecting a sequence of signals from the constellation in accordance with the allocation. The sequence of the signals is transmitted to the three or more communication terminals.

There is also provided, in accordance with an embodiment of the present invention, a method for communication. The method includes receiving a definition of at least first and second signal constellations defined in a signal space for use on a signal carrier. Each signal constellation includes multiple constellation points, such that the signal points in the first signal constellation represent a first number of bits and the signal points in the second signal constellation represent a second number of the bits, different from the first number, and such that the signal constellations correspond to different counts of currently-active communication terminals communicating on the signal carrier. Signals transmitted over the signal carrier are received using a current signal constellation selected from the at least first and second signal constellations. The current signal constellation is identified, and the received signals are demodulated based on the identified signal constellation to generate a data stream from among one or more data streams that are transmitted to the currently-active communication terminals on the signal carrier.

There is additionally provided, in accordance with an embodiment of the present invention, a method for communication. At least first and second signal constellations are defined in a signal space, each signal constellation including multiple constellation points, such that the constellation points in the first signal constellation represent a first number of bits and the constellation points in the second signal constellation represent a second number of the bits, different from the first number. A count of currently-active communication terminals on a signal carrier is determined. One of the first and second signal constellations is selected responsively to the count of the currently-active communication terminals. The method further includes communicating with the currently-active communication terminals on the signal carrier using the selected signal constellation.

There is also provided, in accordance with an embodiment of the present invention, a method for communication with communication terminals. The method includes defining a first operational mode, in which a base station communicates with up to two of the communication terminals over a given carrier by exchanging up to two mutually-orthogonal signals with the respective terminals. A second operational mode is defined, in which the base station communicates with three or more of the communication terminals over the given carrier by exchanging a sequence of modulated signals associated with a signal constellation including constellation points in a signal space. The signal constellation includes at least one constellation point having at least one bit respectively allocated for communication with each of the three or more communication terminals. A capability of a given communication terminal to communicate in each of the first and second operational modes is identified. One of the first and second operational modes is selected for communication with the given communication terminal responsively to the identified capability.

There is further provided, in accordance with an embodiment of the present invention, a communication apparatus that includes a receiver and a demodulator. The receiver is arranged to receive a sequence of signals, each selected from a signal constellation including multiple constellation points in a signal space, such that each constellation point corresponds to a signal representing a respective combination of values of two or more bits, wherein first and second subsets of the bits, which have respective first and second demodulation performance levels that differ from one another, are respectively allocated in each of the constellation points to modulation of first and second data. The demodulator is arranged to demodulate the received sequence of the signals and to reconstruct the first data based on the demodulated signals.

There is also provided, in accordance with an embodiment of the present invention, a communication apparatus that includes a processor and a transmitter. The processor is arranged to define a signal constellation including multiple constellation points in a signal space, such that each constellation point corresponds to a signal representing a respective combination of values of two or more bits, and to further define an allocation of first and second subsets of the bits in each of the constellation points for data transmission to respective first and second communication terminals, such that the first and second subsets have different, respective first and second demodulation performance levels. The transmitter is arranged to modulate respective first and second data destined to the first and second communication terminals by selecting a sequence of signals from the constellation in accordance with the allocation, and to transmit the sequence of the modulated signals to the first and second communication terminals.

There is additionally provided, in accordance with an embodiment of the present invention, a communication apparatus that includes a receiver and a demodulator. The receiver is arranged to receive a sequence of signals, each signal selected from a signal constellation including multiple constellation points in a signal space, such that each constellation point corresponds to a signal representing a respective combination of values of at least three bits. Three or more subsets of the bits are respectively allocated in each of the constellation points to three or more data streams. The demodulator is arranged to demodulate the received sequence of the signals and to reconstruct one of the three or more data streams based on the demodulated signals.

There is further provided, in accordance with an embodiment of the present invention, a communication apparatus that includes a processor and a transmitter. The processor is arranged to define a signal constellation including multiple constellation points in a signal space, such that each constellation point corresponds to a signal representing a respective combination of values of at least three bits, and to further define an allocation of three or more subsets of the bits in each of the constellation points for data transmission to respective three or more communication terminals. The transmitter is arranged to modulate three or more data streams destined respectively to the three or more communication terminals by selecting a sequence of signals from the constellation in accordance with the allocation, and to transmit the sequence of the signals to the three or more communication terminals.

There is also provided, in accordance with an embodiment of the present invention, a communication apparatus that includes a receiver and a demodulator. The receiver is arranged to receive signals transmitted over a signal carrier using a current signal constellation selected from at least first and second signal constellations defined in a signal space. Each signal constellation includes multiple constellation points, such that the signal points in the first signal constellation represent a first number of bits and the signal points in the second signal constellation represent a second number of the bits, different from the first number, and such that the signal constellations correspond to different counts of currently-active communication terminals communicating on the signal carrier. The demodulator is arranged to identify the current signal constellation and to demodulate the received signals based on the identified signal constellation to generate a data stream from among one or more data streams that are transmitted to the currently-active communication terminals on the signal carrier.

There is also provided, in accordance with an embodiment of the present invention, a communication apparatus that includes a processor and a transmitter. The processor is arranged to define at least first and second signal constellations in a signal space, each signal constellation including multiple constellation points, such that the constellation points in the first signal constellation represent a first number of bits and the constellation points in the second signal constellation represent a second number of the bits, different from the first number, to determine a count of currently-active communication terminals on a signal carrier, and to select one of the first and second signal constellations responsively to the count of the currently-active communication terminals. The transmitter is arranged to communicate with the currently-active communication terminals on the signal carrier using the selected signal constellation.

There is additionally provided, in accordance with an embodiment of the present invention, apparatus for communication with communication terminals, which includes a processor and a transmitter. The processor is arranged to define a first operational mode for communication with up to two of the communication terminals over a given carrier by exchanging up to two mutually-orthogonal signals with the respective terminals, and to further define a second operational mode for communication with three or more of the communication terminals over the given carrier by exchanging a sequence of modulated signals associated with a signal constellation including constellation points in a signal space, wherein the signal constellation includes at least one constellation point having at least one bit allocated for communication with each of the three or more communication terminals, to identify a capability of a given communication terminal to communicate in each of the first and second operational modes, and to select one of the first and second operational modes responsively to the identified capability. The transmitter is arranged to communicate with the given communication terminal using the selected operational mode.

In some embodiments, reconstructing the first data includes selecting the first subset of the bits from the demodulated sequence. In an embodiment, defining the signal constellation includes allocating the subsets of the bits based on at least one type of the demodulation performance levels selected from a group of types consisting of a Signal-to-Noise Ratio (SNR), a Carrier-to-Interference Ratio (CIR), a Bit Error Rate (BER) and a Frame Error Rate (FER). Defining the signal constellation may include assigning the three or more data streams for transmission to respective three or more communication terminals. Reconstructing the data streams may include, at a given communication terminal, selecting a respective subset of the bits that is assigned to the given communication terminal from the demodulated sequence.

In some embodiments, defining the signal constellation includes defining the constellation for use in a given time slot within a series of time frames, and receiving and demodulating the sequence include receiving and demodulating the signals in the given time slot. In an embodiment, receiving the sequence includes receiving a Global System for Mobile communications (GSM) EDGE Radio Access Network (GERAN) downlink signal. Modulating the three or more data streams may include multiplexing the three or more data streams to form a composite data stream, and modulating the composite data stream in accordance with the allocation. In an embodiment, identifying the current signal constellation includes receiving a signaling message indicating the current signal constellation. Additionally or alternatively, identifying the current signal constellation includes identifying the current signal constellation by processing the signals transmitted over the signal carrier using the current signal constellation.

The present invention will be more fully understood from the following detailed description of the embodiments thereof, taken together with the drawings in which:

DETAILED DESCRIPTION OF EMBODIMENTS

Communication using high-order modulation provides high spectral efficiency, i.e., enables high-data-rate communication with several communication terminals in a given spectrum. Extensive measurements over live networks have shown that the signal quality in many existing cellular networks is sufficient for supporting such high-order modulation schemes. See, for example, "Assessment of Higher Order Modulation and Turbo Coding (HOT) Performance Based on EGPRS Performance in Live Networks," Document GP-062124 of 3GPP TSG GERAN #32, Sophia Antipolis, France, Nov. 13-17, 2006, which is incorporated herein by reference.

Embodiments of the present invention that are described hereinbelow provide improved methods and systems for communication in wireless networks. The methods and systems described herein communicate with multiple communication terminals simultaneously on a given carrier using high-order modulation schemes. In accordance with an embodiment, the methods and systems described herein may be used for simultaneous voice communications. In some embodiments, a base station defines a signal constellation, which comprises multiple constellation points in a signal space. Each constellation point corresponds to a combination of values of two or more bits. In other words, when transmitting a sequence of symbols, each selected from the signal constellation, the sequence conveys two or more bits per symbol.

The base station allocates a subset of the bits in each constellation point for communication with each communication terminal. The base station transmits a sequence of symbols selected from the constellation to the multiple communication terminals. Each terminal receives and demodulates the sequence and extracts its own allocated subset of the bits, containing the data addressed to the terminal, from the sequence. In some embodiments, the base station allocates three or more subsets of the bits in each constellation point for communication with three or more terminals.

In some embodiments, different communication terminals encounter different conditions that affect their demodulation performance levels, e.g., different target Signal-to-Noise Ratios (SNRs) or Carrier-to-Interference Ratios (CIRs). For example, communication terminals may be located at different distances from the base station and/or experience different levels of interference. In some signal constellations, different bits may have different levels of robustness, e.g., different error probabilities. In such cases, the base station may allocate bits within the constellation points to the terminals by matching the robustness of the bits to the desired demodulation performance levels of the terminals. For example, a terminal that is distant from the base station may be assigned a robust subset of bits having a relatively low error probability. Another terminal, which is closer to the base station, may be assigned a subset of bits having a higher error probability. By matching the bit allocation to the desired performance levels of the terminals, terminals having different operating conditions are more likely to achieve the desired performance level.

In some communication networks, one or more of the terminals receive the base station signals intermittently, i.e., during certain time periods having a relatively low duty cycle. These time periods are often uncorrelated between different terminals. In such cases, the number of terminals that actively receive the base station signals may vary over time. In some embodiments, the base station predefines multiple signal constellations, which correspond to different numbers of concurrently-active terminals. The base station selects a signal constellation to be used for transmission to the terminals at a given point in time based on the number of terminals that are active at that time. The terminals determine the constellation used and demodulate the base station signal accordingly.

Since the constellation order is selected to match the current number of active terminals, rather than the maximum possible number of terminals, relatively low-order constellations can be used. As a result, the demodulation performance (e.g., error probability) of the terminals is improved.

In some networks, the base station communicates with communication terminals having different capabilities. In particular, some terminals may support the high-order modulation schemes described here and some may not. In some embodiments, the base station determines the capability of the different terminals to support communication using high-order modulation, and communicates using high-order modulation selectively, i.e., only with terminals having the appropriate capabilities.

Figure 1:
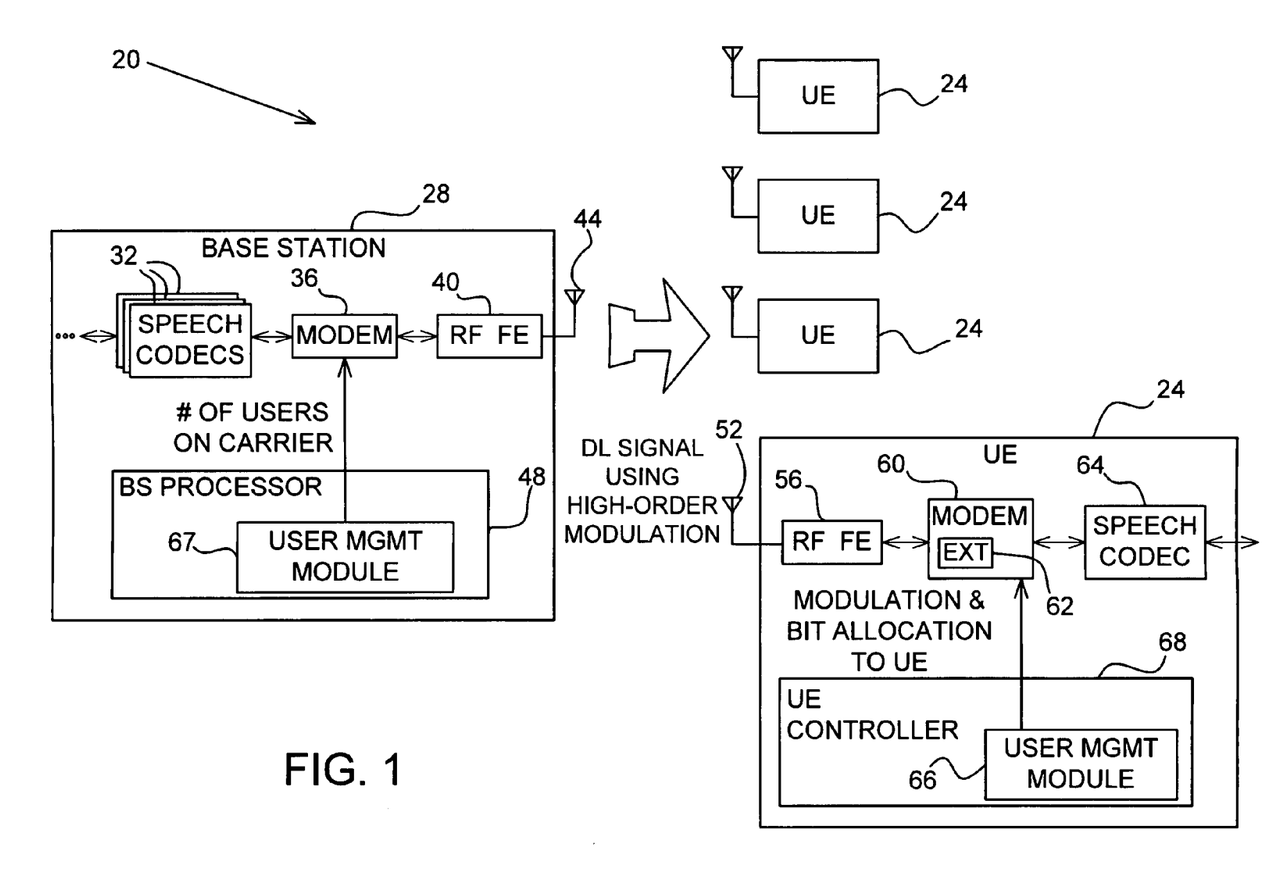
FIG. 1 is a block diagram that schematically illustrates a wireless communication system, in accordance with an embodiment of the present invention.

FIG. 1 is a block diagram that schematically illustrates a wireless communication system 20, in accordance with an embodiment of the present invention. In system 20, wireless communication terminals 24 (also referred to as a User Equipment—UE) communicate with a Base Station (BS) 28 over a wireless channel. In the embodiments described herein, system 20 comprises a Global System for Mobile communications EDGE Radio Access Network (GERAN) system. Alternatively, however, system 20 may conform to various other communication standards and protocols.

On downlink transmission (i.e., transmission from the BS to the UEs), speech that is to be transmitted from BS 28 to UEs 24 is provided to BS speech encoders/decoders (codecs) 32. The BS speech codecs apply speech coding and produce encoded speech frames. (In some embodiments, such as in GSM networks, encoding and decoding of speech frames may be performed by a Transcoder and Rate Adaptation Unit (TRAU), which is external to the base station and may serve multiple base stations.) The speech frames are provided to a BS modulator/demodulator (modem) 36, which modulates the encoded speech to produce a sequence of modulated symbols. The modulation scheme used by modem 36 may comprise a high-order modulation scheme, in which each modulated symbol conveys multiple bits that are destined to multiple UEs. The modulated symbols are selected from a certain signal constellation, which may be changed over time. Various aspects of transmitting downlink signals to multiple UEs using high-order modulation schemes are described in greater detail below.

In some embodiments, modem 36 comprises an Error Correction Code (ECC) encoder (not shown in the figure), which applies channel coding to the encoded speech. ECC encoding and decoding are sometimes also referred to as Forward Error Correction (FEC). The output of modem 36 typically conforms to the communication protocol used by system 20. For example, in a GERAN system, the signal is divided into time frames that are further divided into time slots.

In some embodiments, modem 36 applies ECC jointly to the speech frames destined to the different UEs. For example, the modem may apply ECC separately to each encoded speech frame. The modem then combines the separate ECC-encoded speech frames using a suitable bit mapping function, and interleaves the combined data over the time slots of the GERAN time frame. Alternatively, the modem may aggregate the speech frames intended for transmission in a given GERAN time frame, apply ECC jointly to the aggregated data, and then interleave the ECC-encoded data over the time slots of the GERAN time frame. Any suitable ECC, such as a convolutional code or a Turbo code, may be used.

In either case, the output of modem 36 comprises a sequence of modulated symbols, which carry data that is destined to multiple UEs and is to be transmitted over a particular carrier. In the example of FIG. 1, modem 36 produces a downlink signal for transmission to multiple UEs on a single carrier. In practice, however, BS 28 often transmits two or more downlink carriers simultaneously. Typically, each downlink carrier carries data, voice and/or control information to a different group of UEs. Each such carrier may be modulated, transmitted and received using the methods described herein. For example, the BS may comprise multiple modems 36, each assigned to a respective carrier.

The output of modem 36 is provided to a BS Radio Frequency Front End (RF FE) 40, which typically converts the digital modem output to an analog signal using a suitable Digital to Analog Converter (DAC), up-converts the analog signal to RF and amplifies the RF signal to the appropriate transmission power. The RF FE may also perform functions such as filtering and power control, as are known in the art. The RF signal at the output of RF FE 40 is transmitted via a BS antenna 44 toward UEs 24. BS 28 further comprises a BS processor 48, which configures and controls the different elements of the BS.

The downlink RF signal transmitted from BS 28 is received at one or more UEs. In a given UE, the downlink signal is received by a UE antenna 52, and is provided to a UE RF FE 56. RF FE 56 down-converts the received RF signal to a suitable low frequency (e.g., to baseband), and digitizes the signal using a suitable Analog to Digital Converter (ADC). The digitized signal is provided to a UE modem 60, which demodulates the signal and attempts to reconstruct the speech frames that were provided to BS modem 36 at the BS. In some embodiments, the UE modem comprises an ECC decoder (not shown in the figure), which decodes the channel code applied by the BS.

In some embodiments that are described below, the downlink signal demodulated by modem 60 carries speech frames that are destined to multiple UEs and that support different concurrent communication links. In these embodiments, modem 60 typically demodulates the signal, and then extracts the speech frames destined to the specific UE. In some embodiments, modem 60 comprises an extractor 62, which extracts the speech frames (or other data) destined to the specific UE out of the downlink signal. The reconstructed speech frames are provided to a UE speech codec 64, which decodes the encoded speech conveyed in each speech frame. The decoded speech is then converted to audio and output to the user. UE 24 further comprises a UE controller 68, which configures and controls the different elements of the UE.

(FIG. 1 shows only a single UE in detail for the sake of clarity. Typically, however, corresponding elements appear in the other UEs, as well, which have similar functionality.)

In some embodiments, BS processor 48 comprises a BS user management module 67, which provides BS modem 36 with information regarding the number of users on a particular carrier or time slot. Additionally or alternatively, module 67 may supply any other information that assists or instructs the BS modem as to which modulation scheme to use on a particular carrier or time slot. In some embodiments, UE controller 68 comprises a UE user management module 66, which provides UE modem 60 with information regarding the modulation scheme used in a particular carrier or time slot, for example. In an example embodiment, module 66 may notify modem 60 of the signal constellation used in a given carrier or time slot, and/or the specific bits within the constellation signals that are allocated to the specific UE. This information is typically supplied to UE controller 68 from the BS, using appropriate signaling.

The UE modem uses the information provided by module 66 to demodulate the received downlink signal, and to identify and extract the appropriate data from the demodulated signal. In some embodiments, however, modem 60 determines at least part of this information from the received downlink signal. For example, the UE modem may detect the modulation scheme used in the downlink signal by analyzing the signal itself, without a need to receive this information from module 66.

The description above refers to downlink transmission, i.e., transmission from the BS to the UE. On uplink transmission, UE codec 64 encodes the uplink speech to produce uplink speech frames, and UE modem 60 modulates and formats the uplink signal and applies channel coding. UE RF FE 56 up-converts the signal to RF and transmits the signal toward the BS via UE antenna 52. The uplink RF signal is received by BS antenna 44, down-converted by BS RF FE 40, and demodulated by BS modem 36, which also decodes the ECC. BS codecs 32 decode the uplink speech frames sent from the different UEs, so as to reconstruct the speech that was provided to codecs 64 of the UEs.

Although the description that follows refers to a single BS and a single UE for the sake of clarity, system 20 typically comprises multiple BSs and multiple UEs. The embodiments described herein refer mainly to downlink transmission (i.e., transmission from the BS to the UEs), although system 20 typically carries out bidirectional communication. Although the embodiments described herein refer to transmission of speech, the methods and systems described herein can be used to concurrently transmit any other sort of data to the UEs on the same carrier.

The configuration of UE 24 and BS 28 is a simplified example configuration, which was chosen for the sake of conceptual clarity. In alternative embodiments, any other suitable UE and BS configurations can be used. Typically, BS processor 48 and UE controller comprises general-purpose processors, which are programmed in software to carry out the functions described herein. The software may be downloaded to the processors in electronic form, over a network, for example, or it may, alternatively or additionally, be provided and/or stored on tangible media, such as magnetic, optical, or electronic memory.

As noted above, BS 28 may use various signal constellations for modulating the downlink signal. A given constellation symbol may carry one or more bits. In some embodiments, each constellation symbol carries bits that are destined to different UEs.

Figure 2:
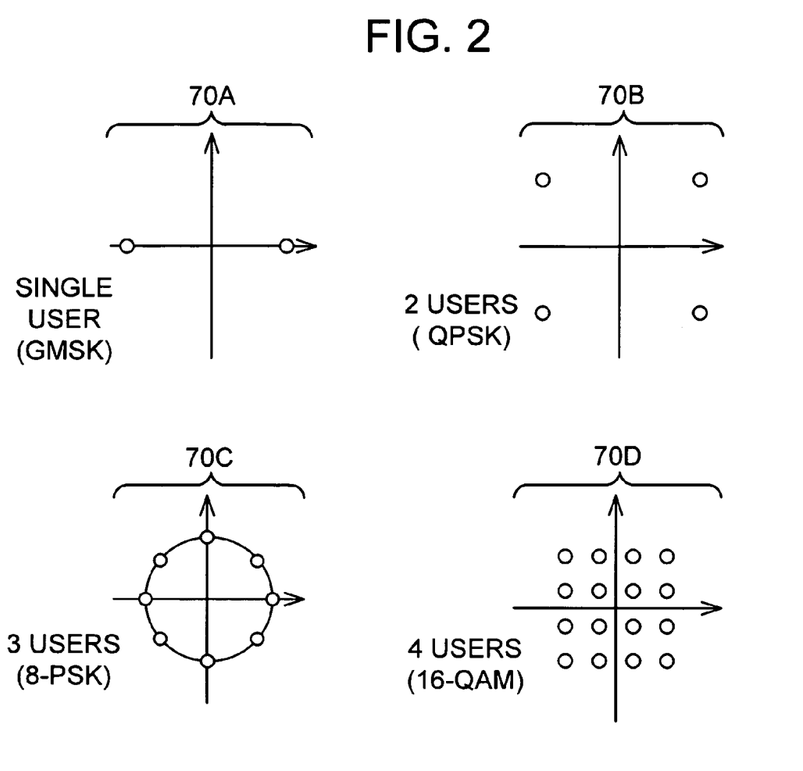
FIG. 2 is a diagram that schematically illustrates a set of signal constellations used in a wireless communication system, in accordance with an embodiment of the present invention.

FIG. 2 is a diagram that schematically illustrates an example set of signal constellations in an In-phase/Quadrature (I/Q) signal space, which are used in system 20, in accordance with an embodiment of the present invention. In the present example, BS 28 selects one of four signal constellations 70A . . . 70D for use on a particular carrier. Constellation 70A comprises two Gaussian Minimum Shift Keying (GMSK) symbols, such that each symbol carries a single bit. Constellation 70B comprises four Quaternary Phase Shift Keying (QPSK) symbols, such that each symbol carries two bits. Constellation 70C comprises eight 8-Phase Shift Keying (8-PSK) symbols, such that each symbol carries three bits. Constellation 70D comprises sixteen 16-Quadrature Amplitude Modulation (QAM) symbols, such that each symbol carries four bits. (Note that the terms "constellation symbols," "constellation signals" and "constellation points" are used herein interchangeably.)

Within a given constellation symbol, any subset of one or more bits can be assigned for downlink communication with a different UE. The different modulation schemes used by BS 28 in the present example, and the possible number of UEs that can be supported by each modulation scheme, are summarized in the following table:

TABLE 1

Example set of downlink modulation schemes

| Modulation | Bits/Symbol | # of UEs |
|---|---|---|
| GMSK | 1 | 1 |
| QPSK | 2 | 1-2 |
| 8-PSK | 3 | 1-3 |
| 16-QAM | 4 | 1-4 |

The bits in the constellation symbols can be allocated to UEs in any suitable manner. Consider, for example, 16-QAM constellation 70D. Each of the sixteen constellation symbols in this constellation carries four bits, denoted B1 . . . B4. These four bits can be assigned for downlink communication with up to four UEs. Several possible assignments are described in the following table:

TABLE 2

Example bit allocations in 16-QAM constellation

| # of UEs | Bit allocation |
|---|---|
| 1 | B1 . . . B4 → UE1 |
| 2 | B1, B2 → UE1 |
|   | B3, B4 → UE2 |
|   | B1 → UE1 |
|   | B2 . . . B4 → UE2 |
|   | . . . |
| 3 | B1 → UE1 |
|   | B2 → UE2 |
|   | B3, B4 → UE3 |
|   | B1, B2 → UE1 |
|   | B3 → UE2 |
|   | B4 → UE3 |
|   | . . . |
| 4 | B1 → UE1 |
|   | B2 → UE2 |
|   | B3 → UE3 |
|   | B4 → UE4 |

Note that Table 2 above shows several bit allocation examples. In alternative embodiments, any other suitable allocations can be used. The set of signal constellations shown in FIG. 2 is chosen by way of example. Any other suitable set of constellations can also be used. For example, the set may comprise a fifth signal constellation, which comprises thirty-two 32-QAM symbols, each carrying five bits. Such a constellation can support up to five UEs.

System 20 may select the signal constellation to be used on a given carrier or time slot, out of the set of possible signal constellations, using any suitable criterion. For example, system 20 may select the constellation based on channel conditions. In such embodiments, when channel conditions are poor (e.g., strong interference and/or low Signal-to-Noise Ratio—SNR), the system may select a more robust but lower-order constellation (i.e., a constellation having fewer bits per symbol), such as GMSK constellation 70A. When channel conditions are good, the system may select higher-order constellations, such as 8-PSK constellation 70C or 16-QAM constellation 70D. Note that higher-order constellations are typically able to support more UEs per symbol. Thus, the number of UEs with which the BS communicates per symbol can be adapted based on channel conditions or other considerations.

In some embodiments (such as in GERAN systems), downlink transmission on a given carrier is divided into time frames that are further divided into time slots, and transmission on each time slot in the frame serves a different group of UEs. In these embodiments, the BS may select the constellation separately for each time slot based on criteria that are related to that time slot.

Typically, in order to communicate with multiple UEs over a given carrier, the BS multiplexes multiple data streams that are addressed to the respective UEs, so as to produce a composite data stream. The BS modulates the composite data stream using the selected signal constellation and in accordance with the specified bit allocation.

In a typical implementation, modems 60 in the UEs assess the channel conditions by measuring the downlink signal, and report these conditions to the BS.

Module 67 in BS processor 48 selects the appropriate constellation based on the downlink channel conditions reported by the UEs. In some embodiments, the BS notifies the UEs of the selected constellation using suitable signaling, and the UEs use this information in order to set their modems to demodulate the downlink signal using the appropriate constellation. Alternatively, a given UE may automatically identify the constellation that is used in the downlink by analyzing the received downlink signal.

In many practical cases, downlink communication with different UEs involves different demodulation performance levels. For example, different UEs may be located at different distances from the base station and/or experience different levels of interference. The term "demodulation performance level" is used to describe any measure of the quality of the signal provided to the UE for demodulation. The demodulation performance level may be represented by an SNR value, a Carrier-to-Interference Ratio (CIR) value, a Bit Error Rate (BER) value, a Frame Error Rate (FER) value, or using any other suitable measure.

In some embodiments, system 20 transmits a given downlink carrier simultaneously to multiple UEs that use different demodulation performance levels. In a given signal constellation, system 20 may allocate the bits within each constellation symbol to the UEs based on the demodulation performance level required from the different UEs. This process uses the fact that different bits in a given constellation may have different error probabilities, and may differ in their demodulation performance level. Thus, bits having lower error probabilities can be allocated to UEs that require higher demodulation performance levels, and vice versa.

It is important in this context to differentiate between bit errors and symbol errors. As noted above, each constellation point comprises bits that carry data to different UEs. When a given UE modem 60 demodulates a certain symbol erroneously, some of the bits carried by this symbol may be erroneous, while others may be correct. In other words, an error in demodulating a symbol does not necessarily mean that all of the bits carried by this symbol will be demodulated erroneously. Bits that are less likely to suffer from bit errors when symbol errors occur are regarded as robust bits, and vice versa.

The connection between symbol errors and bit errors depends, at least partially, on the specific mapping of bits to symbols that is used in the constellation. For example, when adjacent constellation points (having relatively small Euclidean distances between one another) carry the same value of a given bit, this bit will typically be robust. If, on the other hand, the value of a given bit changes between adjacent constellation points, this bit will typically be more sensitive to symbol errors. Some aspects of bit robustness are addressed in U.S. Patent Application Publication 2008/0311918, whose disclosure is incorporated herein by reference.

Figure 3:
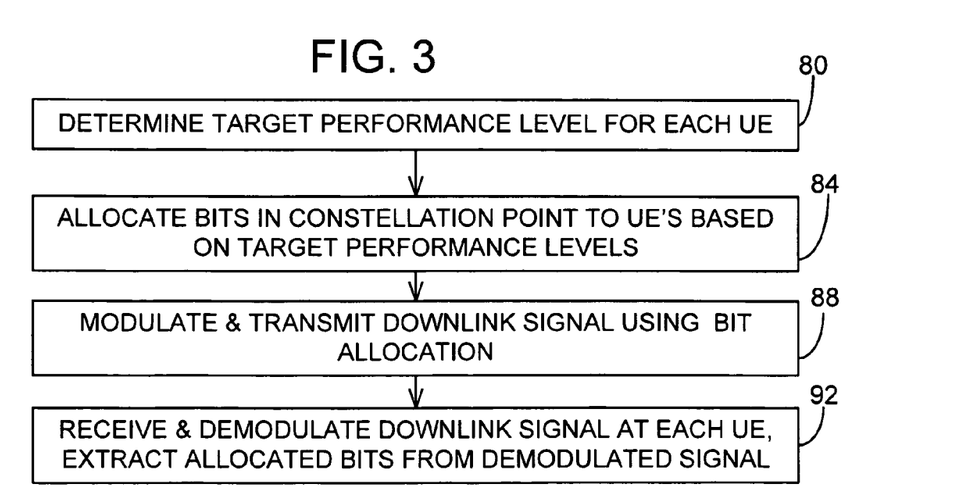
FIGS. 3-5 are flow charts that schematically illustrate methods for communication using high-order modulation schemes, in accordance with embodiments of the present invention.

FIG. 3 is a flow chart that schematically illustrates a method for communication using a high-order modulation scheme, in accordance with an embodiment of the present invention. The method begins with system 20 determining a target demodulation performance level required from each UE at a certain point in time, at a target definition operation 80. Based on these definitions, module 67 in BS processor 48 allocates subsets of bits in each constellation point to respective UEs, at a bit allocation operation 84. Typically, the BS allocates the more robust bits to UEs that are more sensitive to demodulation errors (e.g., UEs that are distant from the base station or UEs that are subject to high interference), and vice versa. Module 67 notifies BS modem 36 of the allocation.

The BS modem modulates the downlink carrier in question to carry multiple simultaneous transmissions intended for different UEs, and RF FE 40 transmits the carrier to the UEs, at a transmission operation 88. The BS modem modulates the carrier using the bit allocation set at operation 84 above, i.e., based on the demodulation performance levels of the UEs. Each UE receives and demodulates the downlink signal, at a reception operation 92. Each UE typically receives and demodulates the entire downlink signal, including the bits that are addressed to it and the bits that are addressed to the other UEs. In accordance with an embodiment, in TDMA systems such as GERAN, separate time slots may thus each carry multiple transmissions which are destined for different UEs. Data may be interleaved among the different time slots in compliance with GERAN standards.

A given UE modem extracts from each demodulated symbol the specific bit or bits that are destined to its respective UE. Typically, the BS notifies the UEs of the bit allocation used in the downlink using appropriate signaling, so that each UE can extract the appropriate bit or bits from the demodulated downlink symbols. Since each subset of bits may be allocated to a respective UE based on the demodulation performance level of that UE, each UE should have a high likelihood of meeting its target performance level.

In some embodiments, the BS transmits to a given UE intermittently, i.e., in transmission periods having a relatively low duty cycle. In GERAN systems, for example, the BS and UEs may use a Discontinuous Transmission (DTX) mode. Generally, downlink DTX operation is managed individually for each UE, irrespective of DTX operation of other UEs on the same carrier. Thus, when one or more of the UEs on a given carrier is in a DTX mode of operation, the number of UEs that are currently active (i.e., actively receive the downlink signal) may vary over time. In some embodiments, system 20 matches the constellation used for transmitting the downlink signal to the number of currently-active UEs that need to be served. When the number of active UEs increases, the BS switches to higher-order constellations. When the number of active UEs decreases, the BS may be able to select lower-order constellations.

In some embodiments (such as in GERAN systems), downlink transmission on a given carrier is divided into time frames that are further divided into time slots, and transmission on each time slot in the frame serves a different group of UEs. In these embodiments, the BS determines the current number of active UEs separately for each time slot in the frame. The BS selects the appropriate constellation for use in a given time slot based on the number of currently-active UEs in that time slot.

The Selection of a modulation scheme may thus be based on various presently standardized inputs, such as channel conditions for example, as well as additional inputs such as the number of simultaneous data transmissions which are to be carried on a given carrier.

Figure 4:
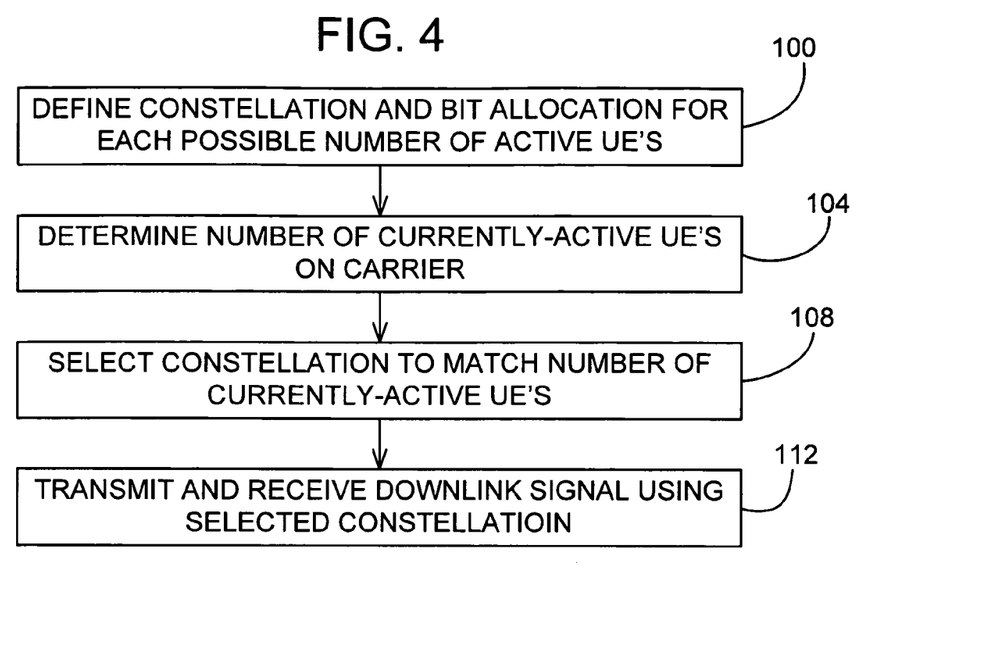

FIG. 4 is a flow chart that schematically illustrates a method for communication using high-order modulation schemes, in accordance with an embodiment of the present invention. The method begins with system 20 accepting a definition of a set of constellations to be used on a given carrier, at a constellation definition operation 100. The definition specifies the constellation to be used for each possible number of currently-active UEs. In some embodiments, the definition also specifies the allocation of bits to the different UEs within each constellation symbol of each constellation.

For example, the definition may state the following:

TABLE 3

Example constellation set for Discontinuous Transmission (DTX) operation

| # of simultaneously-active UEs on carrier | Constellation to be used for transmitting carrier |
| --- | --- |
| 1 | GMSK |
| 2 | QPSK |
| 3 | 8-PSK |
| 4 | 16-QAM |

When transmitting on the downlink, the BS determines the current number of active UEs, at a current UE identification operation 104. This number is between zero and the total number of UEs assigned to the carrier in question. Module 67 in the BS processor selects the signal constellation to be used, based on the number of currently-active UEs (and possibly based on additional inputs and criteria), at a constellation selection operation 108. The BS transmits the downlink signal to the currently-active UEs using the selected constellation, and the UEs receive and demodulate the downlink signal, at a transmission/reception operation 112. As noted above, the UEs may receive signaling messages that define the constellation used, or identify the constellation automatically.

Since the constellation used at any given time is matched to the actual number of currently-active UEs, system 20 may use lower-order constellations whenever possible. As a result, the robustness of the downlink signal is enhanced. As noted above, the BS may apply a process that selects the appropriate constellation (e.g., the constellation having the lowest feasible order) based on a combination of inputs, such as channel conditions, number of currently-active UEs, etc.

In some embodiments, the BS transmits Silence Descriptors (SIDs), which identify the silent periods of the different UEs. The BS may control the transmission times of the SIDs, so as to distribute them over time. Typically, the BS attempts to avoid a situation in which multiple SIDs overlap, since this situation may cause the use of a higher-order constellation. Spreading the SIDs over time may enable the BS to use more robust lower-order constellations.

In some embodiments, the BS communicates with several types of UEs having different capabilities. Specifically, the above-described methods that transmit data to multiple UEs simultaneously using high-order modulation schemes may be supported by only some of the currently-active UEs. Other UEs may not support these features. For example, some UEs may comprise legacy UEs that support GMSK modulation only, or legacy UEs that support higher order modulation for transmitting to a single UE (e.g., for accommodating different channel conditions). In some embodiments, the BS transmits downlink signals to each UE based on its capabilities. In the present context, supporting high-order modulation means the ability to demodulate a signal constellation having more than two bits per symbol, in which different subsets of bits in each constellation point carry information that is destined to multiple different UEs, and the ability to extract the information destined to the specific UE from such a signal.

Figure 5:
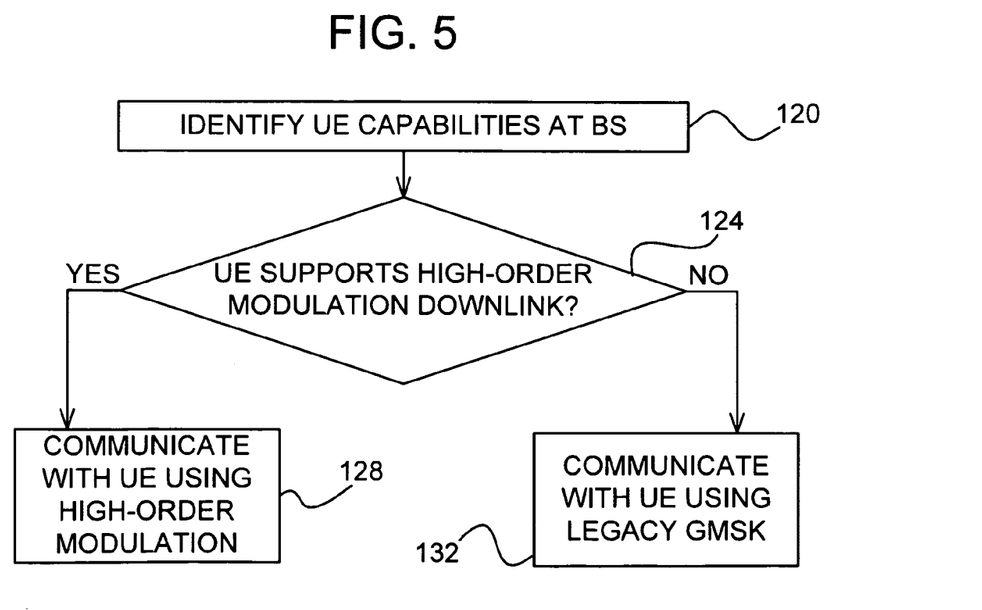

FIG. 5 is a flow chart that schematically illustrates a method for selectively communicating using high-order modulation schemes, in accordance with an embodiment of the present invention. The method begins with the BS identifying the capabilities of each UE, at a capability identification operation 120. For example, each UE may report its capabilities using appropriate signaling when it initially registers with the network and/or when it initiates communication with the BS.

Specifically, the capabilities definition of a given UE indicates whether or not it supports the use of high-order modulation schemes.

The BS checks whether a given UE supports high-order modulation, at a support checking operation 124. If the UE supports reception of high-order modulation transmissions destined to multiple UEs, the BS communicates with the UE using the methods described above, at a high-order modulation communication operation 128. Otherwise, the BS communicates with the UE using legacy constellations, at a GMSK communication operation 132. In an embodiment, some legacy schemes may transmit to up to two UEs per symbol, using mutually-orthogonal modulation. For example, the BS may transmit two mutually-orthogonal GMSK signals, one destined to each UE. Note that high-order modulation schemes that are used merely to transmit data at a higher-rate to a single UE (i.e., high-order modulation schemes in which all the bits of the constellation symbols are assigned to a single UE) are also regarded herein as a legacy modulation schemes. In some embodiments, the BS may assign UEs to carriers based on their capabilities. For example, the BS may assign UEs that support high-order modulation and UEs that do not support these modulation schemes to different carriers.

In GERAN systems, the BS transmits signaling to the UE using Slow Access Control Channels (SACCH) and Fast Access Control Channels (FACCH). In a typical implementation, multiple GERAN time frames (e.g., frames) are grouped to form a multiframe, and one frame in the multiframe is dedicated to SACCH transmission. When using the high-order modulation schemes described herein, the BS may transmit the SACCH in various manners. In some embodiments, the BS may transmit the SACCH to the different UEs simultaneously in the dedicated time frame, using the high-order constellations and bit allocation schemes described above. Alternatively, the BS may eliminate the need for a dedicated SACCH frame, and allocate resources for SACCH in the bits transmitted over the speech frames.

Unlike SACCH signaling, FACCH signaling is usually sensitive to latency and should not be delayed. As such, a FACCH block is typically sent to a given UE by replacing a speech frame on the UEs Traffic Channel (TCH). When using the high-order modulation schemes described herein, a FACCH block can be transmitted to a given UE using the bits allocated to the UE in the appropriate signal constellation or constellations transmitted by the BS.

The BS may sometimes use additional signaling for indicating the content of the transmitted time slots to the UEs. This additional signaling may employ a combined header, which comprises, for example, information regarding the speech codec mode of each UE. FACCH and other signaling can also be carried out over some bits of this header.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
    defining a signal constellation comprising multiple constellation points in a signal space, such that each constellation point corresponds to a signal representing a respective combination of values of at least three bits;
    defining an allocation of three or more subsets of the bits to respective data streams for transmission to three or more respective communication terminals, wherein each bit is assigned to a single respective data stream;
    receiving a sequence of signals, wherein each signal in the sequence is selected from the signal constellation and the bits of each signal in the sequence are allocated to the three or more data streams in accordance with the allocation;
    demodulating the received sequence of the signals; and
    reconstructing one of the three or more data streams at a given communication terminal based on the demodulated signals, by selecting a respective subset of the bits that is assigned to the given communication terminal from the demodulated sequence.

2. The method according to claim 1, wherein defining the signal constellation comprises defining the constellation for use in a given time slot within a series of time frames, and wherein receiving and demodulating the sequence comprise receiving and demodulating the signals in the given time slot.

3. The method according to claim 2, wherein receiving the sequence comprises receiving a Global System for Mobile communications (GSM) EDGE Radio Access Network (GERAN) downlink signal.

4. A method for communication, comprising:
    defining a signal constellation comprising multiple constellation points in a signal space, such that each constellation point corresponds to a signal representing a respective combination of values of at least three bits;
    defining an allocation of three or more subsets of the bits in each of the constellation points for data transmission respectively to three or more communication terminals, wherein the allocation assigns each bit to a single respective data stream;
    modulating three or more data streams destined respectively to the three or more communication terminals by multiplexing the three or more data streams to form a composite data stream, and modulating the composite data stream by selecting a sequence of signals from the constellation such that the bits of each signal in the sequence are allocated to the three or more data streams in accordance with the allocation; and
    transmitting the sequence of the signals to the three or more communication terminals.

5. The method according to claim 4, wherein defining the signal constellation comprises defining the constellation for use in a given time slot within a series of time frames, and wherein transmitting the sequence comprise transmitting the signals in the given time slot.

6. The method according to claim 5, wherein transmitting the sequence comprises transmitting a Global System for Mobile communications (GSM) EDGE Radio Access Network (GERAN) downlink signal.

7. A communication apparatus, comprising:
    a receiver, which is arranged to receive a sequence of signals, each signal selected from a signal constellation comprising multiple constellation points in a signal space, such that each constellation point corresponds to a signal representing a respective combination of values of at least three bits wherein three or more subsets of the bits are allocated to respective data streams such that each bit is assigned to a single respective data stream; and
    a demodulator, which is arranged to demodulate the received sequence of the signals, and to reconstruct one of the three or more data streams based on the demodulated signals, by selecting from the demodulated sequence a respective subset of the bits that is allocated to the one of the three or more data streams.

8. The apparatus according to claim 7, wherein the three or more data streams are assigned for transmission to respective three or more communication terminals.

9. The apparatus according to claim 7, wherein the signal constellation is defined for use in a given time slot within a series of time frames, and wherein the receiver is arranged to receive the sequence and the demodulator is arranged to demodulate the signals in the given time slot.

10. The apparatus according to claim 7, wherein the sequence comprises a Global System for Mobile communications (GSM) EDGE Radio Access Network (GERAN) downlink signal.

11. A communication apparatus, comprising:
    a processor, which is arranged to define a signal constellation comprising multiple constellation points in a signal space, such that each constellation point corresponds to a signal representing a respective combination of values of at least three bits, and to further define an allocation of three or more subsets of the bits in each of the constellation points for data transmission to respective three or more communication terminals, wherein the allocation assigns each bit to a single respective data stream; and
    a transmitter, which is arranged to modulate three or more data streams destined respectively to the three or more communication terminals by multiplexing the three or more data streams to form a composite data stream and modulating the composite data stream by selecting a sequence of signals from the constellation such that the bits of each signal in the sequence are allocated to the three or more data streams in accordance with the allocation, and to transmit the sequence of the signals to the three or more communication terminals.

12. The apparatus according to claim 11, wherein the signal constellation is defined for use in a given time slot within a series of time frames, and wherein the transmitter is arranged to modulate the data streams and to transmit the sequence in the given time slot.

13. The apparatus according to claim 12, wherein the sequence comprises a Global System for Mobile communications (GSM) EDGE Radio Access Network (GERAN) downlink signal.

* * * * *